United States Patent
Ice, Jr. et al.

(10) Patent No.: US 7,330,966 B2
(45) Date of Patent: Feb. 12, 2008

(54) PROVIDING SECURITY BASED ON A DEVICE IDENTIFIER PRIOR TO BOOTING AN OPERATING SYSTEM

(75) Inventors: Herbert Jackson Ice, Jr., Austin, TX (US); Dennis Sposato, Austin, TX (US)

(73) Assignee: Lenovo (Singapore) Pte Ltd., Singapore (SG)

(*) Notice: Subject to any disclaimer, the term of this patent is extended or adjusted under 35 U.S.C. 154(b) by 1047 days.

(21) Appl. No.: 10/383,358

(22) Filed: Mar. 6, 2003

(65) Prior Publication Data
US 2004/0177265 A1 Sep. 9, 2004

(51) Int. Cl.
G06F 9/00 (2006.01)
G06F 11/30 (2006.01)
G06F 7/04 (2006.01)

(52) U.S. Cl. ............... 713/2; 713/189; 726/2
(58) Field of Classification Search .......... 713/2, 713/189; 726/2
See application file for complete search history.

(56) References Cited

U.S. PATENT DOCUMENTS

| | | | | |
|---|---|---|---|---|
| 5,012,514 | A * | 4/1991 | Renton | 713/192 |
| 5,191,323 | A | 3/1993 | Abbes et al. | 340/825.37 |
| 5,349,643 | A | 9/1994 | Cox et al. | 380/25 |
| 2001/0052069 | A1* | 12/2001 | Sekiguchi | 713/2 |
| 2002/0165023 | A1* | 11/2002 | Brosnan et al. | 463/29 |
| 2003/0046529 | A1* | 3/2003 | Loison et al. | 713/2 |
| 2004/0059900 | A1* | 3/2004 | Backman et al. | 713/1 |

OTHER PUBLICATIONS

Japanese Patent Abstract, JP200202493A2. "Security Device of Data Processing System", Published Jan. 25, 2002, Filed Jul. 5, 2000.

(Continued)

*Primary Examiner*—Kambiz Zand
*Assistant Examiner*—Christopher J Brown
(74) *Attorney, Agent, or Firm*—Duke W. Yee; Scott W. Reid; Peter B. Manzo (57) ABSTRACT

A method and apparatus for providing security based on a device identifier prior to booting an operating system on the computing device. Upon power on of a computing device, pre-execution services (PES) are loaded. The PES includes services for retrieving a device identifier from a network interface device and sending the device identifier to a validation server that validates the device identifier based on a database of valid device identifiers. The validation server may perform a lookup of the device identifier in the database and, if the device identifier is present in the database, retrieve rules associated with that device identifier to determine if the device identifier is still valid under current conditions. The rules are applied to data representing current conditions to determine if all requirements for allowing access to the computing system are satisfied. Based on the application of the rules for the device identifier, a determination is made as to whether the device identifier is valid or not. If the device identifier is not valid, a command is sent back to the computing device instructing the computing device to shutdown and not complete the booting sequence. If the device identifier is valid, then a message is sent to the computing device indicating that the boot operation may continue and as a result, the operating system of the computing device is booted.

20 Claims, 5 Drawing Sheets

OTHER PUBLICATIONS

IBM Technical Disclosure Bulletin, Oliver et al., "Two-Level Data Security System for an IBM Personal Computer", vol. 29, No. 10, Mar. 1987, pp. 4384-4386.

IBM Technical Disclosure Bulletin, Simpson et al., "Unauthorized Use Protection for a Computer", vol. 18, No. 10, Mar. 1976, pp. 3197-3198.

IBM Technical Disclosure Bulletin, Kallestad et al., "Auto Initial Program Load Function", vol. 32, No. 2, Jul. 1989, pp. 115-116.

U.S. Appl. No. 09/329,457, Sposato, Method and Apparatus for Remote Client Boot Using Chip Emulation, Jun. 10, 1999.

U.S. Appl. No. 09/282,725, Cromer et al., Method and System for Authenticated Boot Operations, Mar. 31, 1999.

* cited by examiner

PROVIDING SECURITY BASED ON A DEVICE IDENTIFIER PRIOR TO BOOTING AN OPERATING SYSTEM

BACKGROUND OF THE INVENTION

1. Technical Field

The present invention is directed to a method and apparatus for providing security based on a device identifier prior to booting an operating system. More specifically, the present invention provides a mechanism for controlling boot of computing devices based on a validation of the media access controller address of the network interface card of the computing device.

2. Description of Related Art

Security of computing networks and computing devices is an issue that becomes more important as the use of computing networks and devices continues to expand. Typically, security is handled by security software or network protocols that are loaded and operated after booting of the computing device. Thus, there is a window of opportunity for a sophisticated interloper to gain access to a computing network or device after boot of the operating system since the computing device actually becomes operable after the operating system is booted. That is, an interloper may load software on the computing device that allows the interloper to circumvent security software that is not yet loaded by the computing system after the operating system has booted.

Thus, it would be beneficial to have an improved method and apparatus for controlling access of computing devices to a computing system prior to booting the operating system.

SUMMARY OF THE INVENTION

The present invention provides a method and apparatus for providing security based on a device identifier prior to booting an operating system on the computing device. With the present invention, upon power on of a computing device, pre-execution services are loaded. The pre-execution services provide an environment in which a limited number of services are available to the computing device prior to booting the operating system. The pre-execution services, or PES, has services available for retrieving a device identifier, e.g., a media access controller address, from a network interface device, such as a network interface card (NIC).

The PES further includes services for sending the device identifier to a validation server that validates the device identifier based on a database of valid device identifiers. The validation server may perform a lookup of the device identifier in the database and, if the device identifier is present in the database, retrieve rules associated with that device identifier to determine if the device identifier is still valid under current conditions. For example, while the device identifier may be valid in general, the associated rules may place limits on the use of the computing device such that the device identifier is not valid at all times or in all circumstances. As an example, the rules may indicate that a computing device may be booted only during the time period of 9 a.m. to 6 p.m.

With the present invention, the rules are applied to current conditions to determine if all requirements for allowing access to the computing system are satisfied. For example, if the rule indicates that the computing device may only be booted between the hours of 9 a.m. and 6 p.m., and the current time is 10:31 a.m., then the device identifier is still valid. Likewise, if the device identifier remains valid only when another computing device is already active on the network, then a determination may be made as to whether the other computing device is active and if so, the device identifier is indicated as being valid.

Based on the application of the rules for the device identifier, a determination is made as to whether the device identifier is valid or not. If the device identifier is not valid, a command is sent back to the computing device associated with that device identifier, instructing the computing device to shutdown and not complete the booting sequence or otherwise enter into a disabled interrupt spin loop. If the device identifier is valid, then a message is sent to the computing device indicating that the boot operation may continue and as a result, the operating system of the computing device is booted. Additional security measures, such as encryption of the messages between the PES of the computing device and the validation server, may be used to secure the system against interlopers.

These an other feature and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
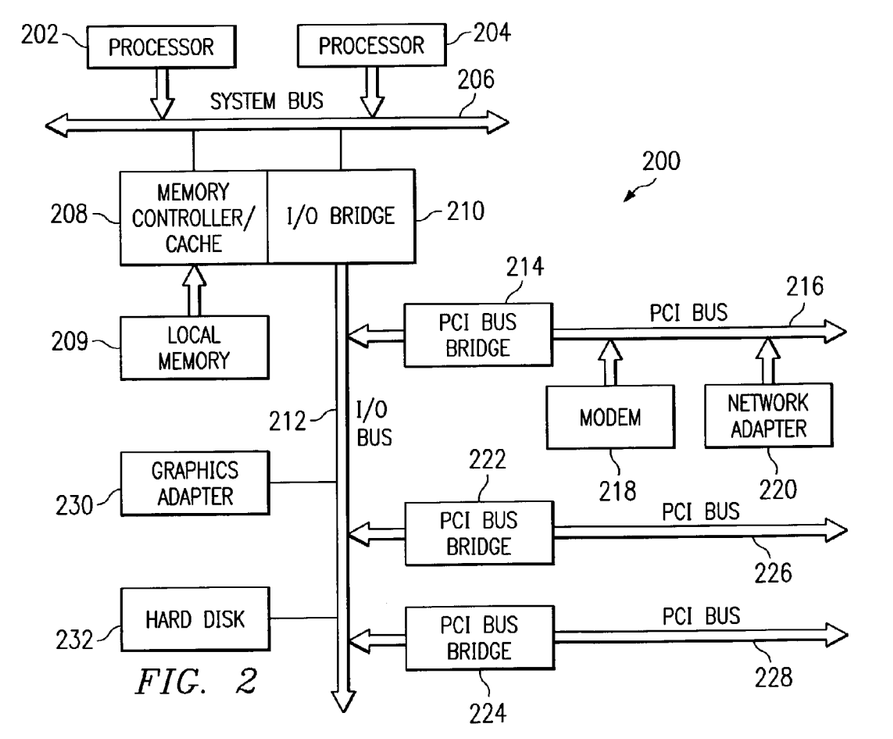
FIG. 2 is an exemplary block diagram of a server computing device according to the present invention.
Figure 3:
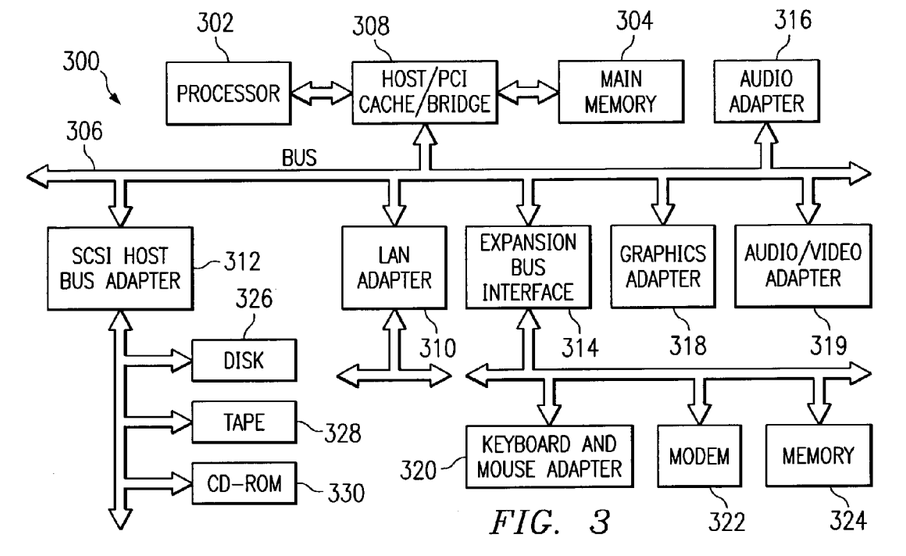
FIG. 3 is an exemplary block diagram of a client computing device according to the present invention.

The preferred embodiments of the present invention are implemented in a distributed data processing environment in which a computing system to which access is sought acts as a client, and a server that performs validation of the device identifiers acts as server to the client. As such, FIGS. 1-3 are provided hereafter as exemplary of the environment and hardware devices in which the present invention may be implemented.

Figure 1:
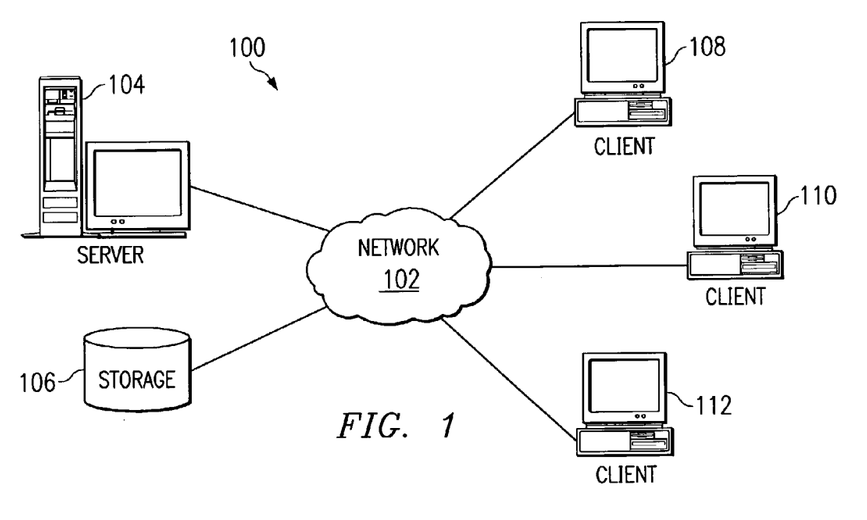
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system. With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned previously, the present invention provides a mechanism for validating access to computing systems based on a device identifier from a network interface device. With the present invention, at power on, a boot process of the computing system is begun and a pre-execution services environment is loaded from either firmware of the computing system or from a server In the pre-execution services environment, a unique device identifier is read from a network interface device present in the computer system and a communication link is established with a server that is used to validate device identifiers. The services of the pre-execution services environment then send the unique device identifier to the server for validation and receive a message from the server to either terminate or continue with the booting process based on whether the device identifier is valid or not.

Figure 4:
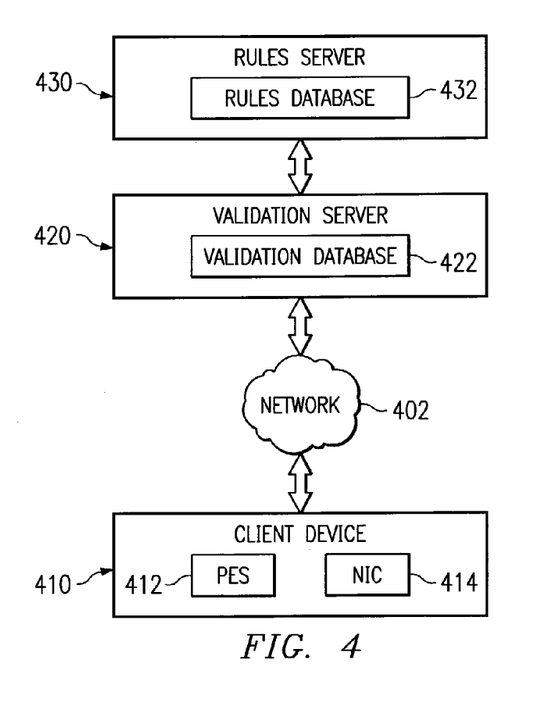
FIG. 4 is an exemplary diagram illustrating the primary operational elements of an exemplary embodiment of the present invention.

FIG. 4 illustrates the primary operational components of a distributed access validation system according to an exemplary embodiment of the present invention. As shown in FIG. 4, the distributed access validation system includes a client device 410 to which access is sought, a network 402, a validation server 420 which has access to a validation database 422, and a rules server 430 which has access to a rules database 432. The client device 410 further includes pre-execution services 412 and a network interface card 414, as described in more detail hereafter.

With the present invention, upon power on of a client device 410, pre-execution services 412 are loaded. The pre-execution services 412 provide an environment in which a limited number of services are available to the client device 410 prior to booting the operating system. The pre-execution services, or PES, 412 has services available for retrieving a device identifier, e.g., a media access controller (MAC) address, from a network interface device, such as a network interface card (NIC) 414. The pre-execution services environment is described in commonly assigned and co-pending U.S. patent application Ser. No. 09/329,457, entitled "Method and Apparatus for Remotely Booting a Client Computer from a Network by Emulating Remote Boot Chips", filed on Jun. 10, 1999, which is hereby incorporated by reference.

In a preferred embodiment, the unique device identifier for the NIC 414 used by the present invention is a media access controller (MAC) address. As is known in the art, MAC addresses are uniquely allocated to devices in a network, such as network 402. Thus, a MAC address uniquely identifies the NIC 414 and therefore, the client device 410. Thus, in the present invention, the MAC address may be used to uniquely validate the client device 410 without requiring the operating system to be booted or information, such as user identification and password, to be supplied by the a user.

The PES 412 of the present invention is extended to include services for sending the device identifier, hereafter referred to as the MAC address in accordance with the preferred embodiment, to a validation server 420 that validates the MAC address 420 based on a validation database 422 in which entries are stored for valid MAC addresses. The PES 412 identifies the validation server 420 by broadcasting a request for an appropriate validation server 420 to respond to the broadcast message and identifying a validation server 420 that responds to the broadcast message. The PES 412 may further include services for encrypting data and message sent to the validation server 420 in order to provide additional security against interlopers and may provide decryption of data and messages received from the validation server 420.

The validation database 422 and validation server 420 may be associated with a particular entity that is concerned with controlling access to its computing devices and computer networks, such as the client device 410 and network 402. For example, the validation server 420 and validation database 422 may be associated with a company, governmental agency, or the like, that stores in the validation database 422 the MAC addresses for client devices 410 that are valid.

The validation server may perform a lookup of the MAC address in the validation database 422 and, if the MAC address is present in the validation database 422, send a request to the rules server 430 to retrieve rules associated with that MAC address. The rules server 430 receives the request from the validation server along with the MAC address and retrieves rules associated with the MAC address from the rules database 432. These rules may then be applied by the rules server 430 or forwarded to the validation server 420 which applies the rules to current conditions to determine if access to the client device 410 should be provided, i.e. determines whether the MAC address is still valid in view of the current circumstances.

The rules stored in the rules database 432 provide boundaries to the circumstances under which access to the client device 410 is permitted, i.e. when the client device 410 is permitted to boot normally and when it is not permitted to boot normally. The rules may take many forms and cover any of a number of different circumstances, all of which cannot be described herein in detail but would be apparent to those of ordinary skill in the art in view of the present description. For example, the rules may indicate time periods when the client device 410 is permitted to boot normally, that the client device 410 may boot normally if a particular other device is currently logged onto the network 402, and the like. Further examples of rules may include prompting for a user identifier and password, allowing only certain individuals to log on from a particular MAC address, notify security personnel that an unauthorized user is attempting to access a machine, shut down the machine at a particular time (this may require a device driver added to the operating system which is capable of shutting down the machine), and the like.

The rules are applied to the current circumstances by applying the rules to information obtained from various sources. For example, if the rule pertains to time periods in which access to the client device 410 is permitted, then a current time may be obtained from time stamp information received in the request for validation originally sent by the client device 410, time information obtained from a system clock resident on the validation server 420, rules server 430 or client device 410, or the like. Similarly, if the rule pertains to a requirement that another device be active on the network 402, a data structure listing the MAC addresses of currently active client devices may be compiled as a consequence of the validation of the MAC addresses and used to identify which client devices 410 are currently active on the network 402.

Thus, based on the application of the rules to current circumstance information or data obtained from one or more information or data sources, the validation server 420 determines whether a valid MAC address continues to remain valid under the current circumstances. If so, the validation server 420 may return an encrypted message to the PES 412 indicating that the client device 410 may continue the boot sequence and boot the operating system. If the MAC address is not valid, either because it is not present in the validation database 422 or is no longer valid based on an application of the rules to the current circumstances information, the validation server 420 may return a command instructing the PES 412 of the client device 410 to shutdown the client device 410 or otherwise place it in a disabled interrupt spin loop such that the client device 410 cannot respond to interrupts outside the PES environment.

In one exemplary embodiment, if the MAC address is not valid for the particular circumstances, either during the initial validation or after application of rules associated with the MAC address, the validation server 420 may send an instruction to the client device 410 instructing the client device 410 to emulate an operating environment so that the user thinks that he/she has accessed the computer network. With such an emulation, operations that may represent security concerns may be made inactive, such as reading from secure files or writing to particular storage devices or files. The emulated operating environment operates as if the operations are being performed according to the input from the user but in actuality, they are not being performed. Meanwhile, the validation server 420 may provide a notification to security personnel indicating the unauthorized attempt to access the computing network. In this way, the user is kept at the client device for apprehension by the security personnel.

While FIG. 4 shows an exemplary architecture of the primary operational components of the present invention, the architecture in FIG. 4 should not be interpreted as limiting to the present invention. Rather, any organization or architecture of the operational components may be used without departing from the spirit and scope of the present invention. For example, while validation server 420 and rules server 430 are illustrated as separate devices, they may be incorporated into a single device that operates as both a validation and rules server.

Moreover, the depicted example illustrates rules server 430 having a secure connection with validation server 420 and thus, the rules server 430 is insulated from attack via the network 402 by the validation server 420. However, in alternative embodiments, the rules server 430 may be accessible by the validation server 420 via the network 402. In addition, rather than the validation database 422 and the rules database 432 being incorporated into the validation server 420 and rules server 430, respectively, the present invention may make use of an architecture in which these databases are distributed and/or accessible via the network 402. Other modifications to the architecture depicted in FIG. 4 may be made without departing from the spirit and scope of the present invention.

Figure 5:
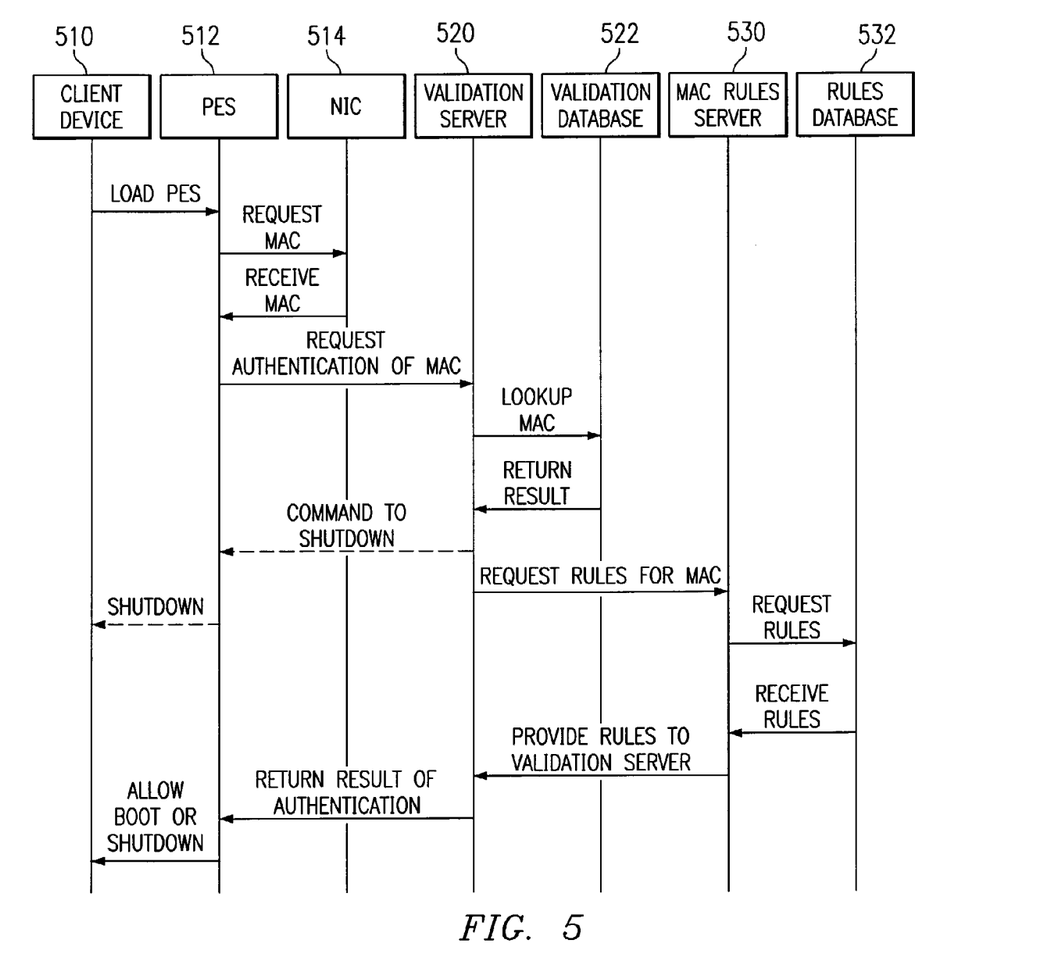
FIG. 5 is an exemplary message/data flow diagram in accordance with the present invention.

FIG. 5 is an exemplary message/data flow diagram illustrating the interaction of the primary operational components of the present invention. As shown in FIG. 5, the operation starts with the PES 512 being loaded in response to a power on condition of the client device 510. The PES 512 requests and receives the MAC address from the NIC 514. The PES 512 then sends a validation request to the validation server 520 which performs a lookup of the MAC address in the validation database 522. The result of the lookup is then returned to the validation server 520.

If the result of the lookup is that the MAC address is not in the validation database 522, then the MAC address is not valid. A command to shutdown, or place the client device 510 in a disabled interrupt spin loop, is sent to the PES 512 (illustrated in dashed arrows). The PES 512 then performs operations to shutdown or place the client device 510 in a disabled interrupt spin loop.

If the result of the lookup is that the MAC address is in the validation database 522, the validation server 520 sends a request for the rules associated with the MAC address to the rules server 530. The rules server 530 then retrieves the rules from the rules database 532. The rules retrieved from the rules database 532 are provided to the validation server 520 which applies the rules to the current circumstances and a result of the validation is returned to the PES 512. This result may be to permit access or not permit access based on whether the MAC address continues to be valid in view of the rules and current circumstances. As a result, the PES 512 performs operations to either allow the boot sequence to continue and boot the operating system, or disable the boot sequence by shutting down the client device 510 or placing it in a disabled interrupt spin loop.

Figure 6:
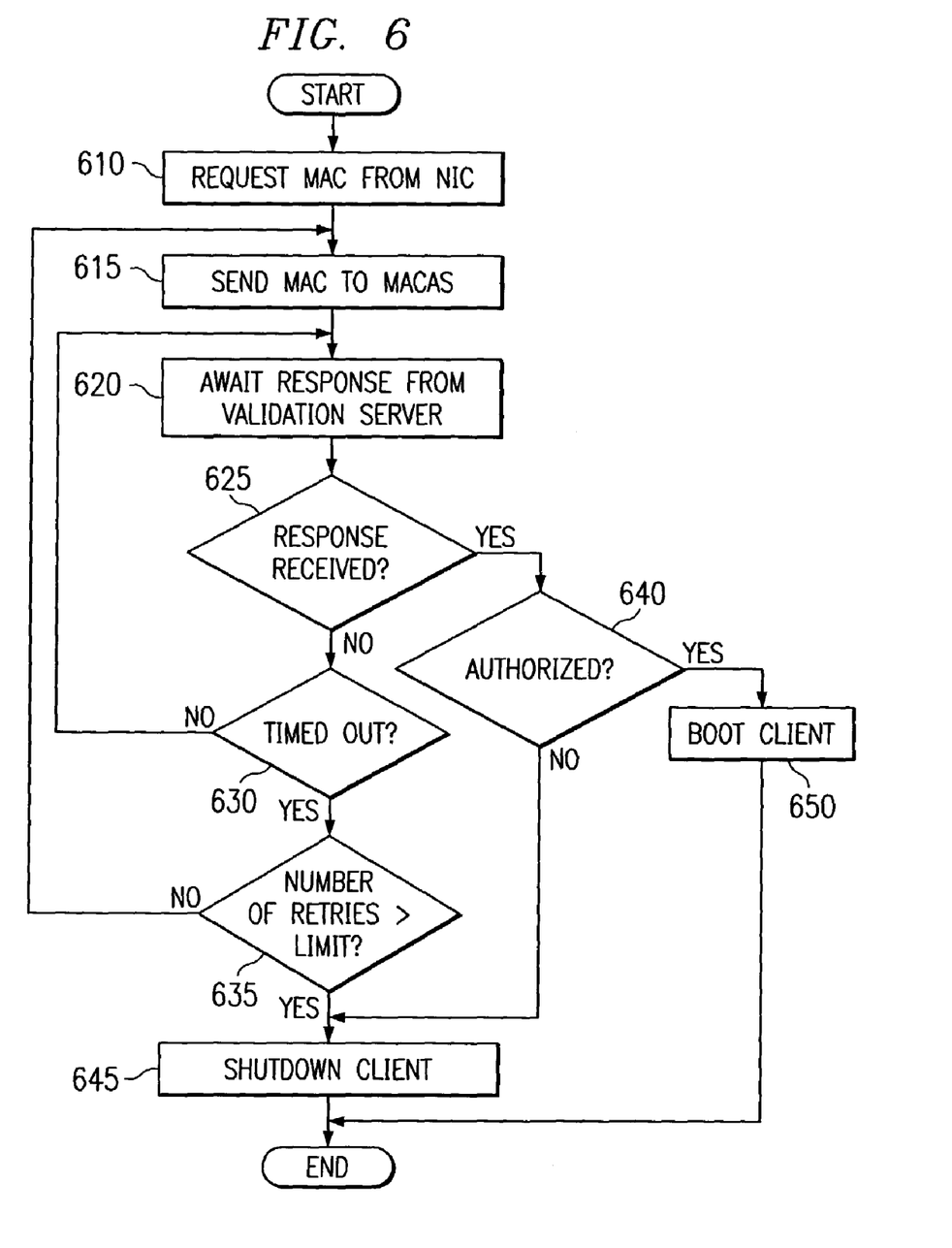
FIG. 6 is a flowchart outlining an exemplary operation of a client device in accordance with the present invention.

FIG. 6 is a flowchart outlining an exemplary operation of a client device according to the present invention. As shown in FIG. 6, the operation starts with a request for the MAC address from the network interface card in response to a power on condition and loading of the PES (step 610). The MAC address is sent to the MAC validation server (step 615) and a response is awaited (step 620).

A determination is made as to whether a response has been received (step 625). If not, a determination is made as to whether the response time has timed out (step 630). If not, the operation returns to step 620. If the response time has timed out, a determination is made as to whether the number of tries to validate the MAC address has exceeded a predetermined limit (step 635). If not, the operation returns to step 615; otherwise the operation proceeds to step 645 where the client is either shutdown or placed in a disabled interrupt spin loop.

If the response is received (step 625), a determination is made as to whether the MAC address is indicated as being valid (step 640). If not, the operation proceeds to step 645 described previously. Otherwise, if the MAC address is valid, the client is permitted to continue the boot sequence and boot the operating system (step 650).

Figure 7:
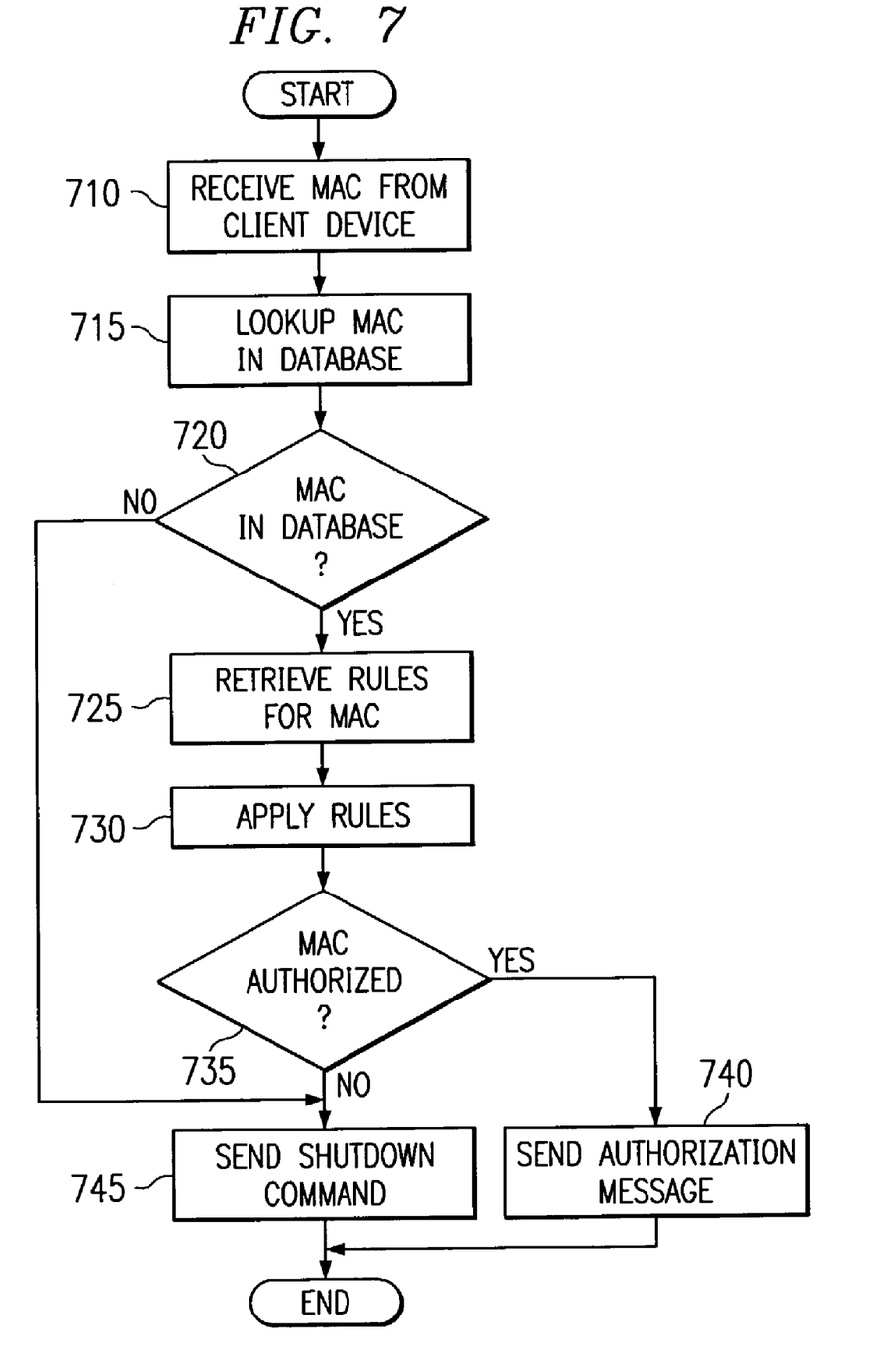
FIG. 7 is a flowchart outlining an exemplary operation of a MAC validation server in accordance with the present invention.

FIG. 7 is a flowchart outlining an exemplary operation of a validation server in accordance with the present invention. As shown in FIG. 7, the operation starts with receipt of a MAC address and a request for validation from a client device (step 710). The MAC address is looked-up in the validation database (step 715) and a determination is made as to whether the MAC address is present in the validation database (step 720). If not, the operation continues to step 745 where a shutdown command is sent to the client device. Otherwise, if the MAC address is present in the validation database, rules associated with the MAC address are retrieved (step 725) and applied to the current circumstances (step 730). A determination is then made as to whether the MAC address is still valid (step 735). If not, a shutdown command is sent to the client device (step 745). If the MAC address is still valid, a message is sent to the client device indicating that the MAC address is valid and that the boot sequence may continue (step 740).

Thus, the present invention provides a mechanism by which a device identifier may be used to control access to a computing device and/or network prior to booting of a computing device. With the present invention, if the device identifier is not part of an authentication rules database, the machine is essentially not even hooked up to the network. In addition, the machine may be effectively turned off or an environment may be emulated in response to a determination that an unauthorized access attempt is being made.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a computing device, for controlling access to a computer system, comprising:
   at power on, beginning a boot process to boot an operating system residing on the computer system, wherein beginning the boot process includes loading a pre-execution services environment on the computer system that limits services for the computer system to provide security based on a unique device identifier prior to booting the operating system;
   reading the unique device identifier from a network interface device present in the computer system;
   establishing communication with a server having means for validating unique device identifiers;
   sending the unique device identifier to the server for validation, wherein the unique device identifier is validated prior to booting the operating system residing on the computer system; and
   receiving a message to perform at least one of terminating the boot process prior to booting the operating system residing on the computer system if the unique device identifier is not valid and completing the boot process by booting the operating system residing on the computer system if the unique device identifier is valid, wherein the steps of reading, establishing, sending and receiving are performed within the pre-execution services environment.

2. The method of claim 1, wherein the server performs validation by accessing a database entry for the unique device identifier.

3. The method of claim 2, wherein the server performs validation by comparing a current time with an allowed time of operation in the database entry.

4. The method of claim 1, wherein the unique device identifier is a media access controller identifier.

5. The method of claim 1, wherein the server performs validation by retrieving one or more rules associated with the unique device identifier and applying the one or more rules to data describing current conditions.

6. The method of claim 1, further comprising:
   encrypting the unique device identifier prior to sending the unique device identifier to the validation server.

7. The method of claim 5, wherein the rules include one or more of time periods when the computing device is permitted to boot, requirement that another particular device be logged onto the computing system, prompting for a user identification and password, allowing only a particular user to log on to the computing system from the computing device, and shutting down the computing device at a particular time.

8. The method of claim 1, further comprising:
   in response to the received message indicating that the boot process is to be terminated, shutting down the computing device.

9. The method of claim 1, further comprising:
   in response to the received message indicating that the boot process is to be terminated, placing the computing device in a disabled interrupt spin loop.

10. The method of claim 1, further comprising:
    in response to the received message indicating that the boot process is to be terminated, emulating an operating environment in which operations on the computing network are inhibited but are emulated as being completed in the emulated operating environment.

11. The method of claim 10, wherein the emulated operating environment operates according to input from an unauthorized user without performing the operations on the computing network, and wherein security personnel are notified that the unauthorized user is attempting to access the computer system.

12. A computer program product in a computer readable medium for controlling access to a computer system, comprising:
    first instructions for beginning a boot process at power on to boot an operating system residing on the computer system, wherein the first instructions for beginning the boot process include instructions for loading a pre-execution services environment on the computer system that limits services for the computer system to provide security based on a unique device identifier prior to booting the operating system;
    second instructions for reading the unique device identifier from a network interface device present in the computer system;
    third instructions for establishing communication with a server having means for validating unique device identifiers;
    fourth instructions for sending the unique device identifier to the server for validation, wherein the unique device identifier is validated prior to booting the operating system residing on the computer system; and
    fifth instructions for receiving a message to perform at least one of terminating the boot process prior to booting the operating system residing on the computer system if the unique device identifier is not valid and completing the boot process by booting the operating system residing on the computer system if the unique device identifier is valid, wherein the second, third, fourth and fifth instructions are executed within the pre-execution services environment.

13. The computer program product of claim 12, further comprising:
    sixth instructions for placing the computing device in a disabled interrupt spin loop in response to the received message indicating that the boot process is to be terminated.

14. The computer program product of claim 12, further comprising:

sixth instructions for emulating an operating environment in which operations on the computing network are inhibited but are emulated as being completed in the emulated operating environment, in response to the received message indicating that the boot process is to be terminated.

15. The computer program product of claim 12, wherein the unique device identifier is a media access controller identifier.

16. The computer program product of claim 14, further comprising:
seventh instructions for operating in the emulated operating environment according to input from an unauthorized user without performing the operations on the computing network; and
eighth instructions for notifying security personnel that the unauthorized user is attempting to access the computer system.

17. An apparatus for controlling access to a computer system, comprising:
means for beginning a boot process at power on to boot an operating system residing on the computer system, wherein the means for beginning the boot process includes means for loading a pre-execution services environment on the computer system that limits services for the computer system to provide security based on a unique device identifier prior to booting the operating system;
means for reading the unique device identifier from a network interface device present in the computer system;
means for establishing communication with a server having means for validating unique device identifiers;
means for sending the unique device identifier to the server for validation, wherein the unique device identifier is validated prior to booting the operating system residing on the computer system; and
means for receiving a message to perform at least one of terminating the boot process prior to booting the operating system residing on the computer system if the unique device identifier is not valid and completing the boot process by booting the operating system residing on the computer system if the unique device identifier is valid, wherein the means for reading a unique device identifier, means for establishing communication with a server, means for sending the unique device identifier to the server, and means for receiving a message operate within the pre-execution services environment.

18. The apparatus of claim 17, wherein the unique device identifier is a media access controller identifier.

19. The apparatus of claim 17, further comprising:
means for emulating an operating environment in which operations on the computing network are inhibited but are emulated as being completed in the emulated operating environment, in response to the received message indicating that the boot process is to be terminated.

20. The apparatus of claim 19, further comprising:
means for operating in the emulated operating environment according to input from an unauthorized user without performing the operations on the computing network; and
means for notifying security personnel that the unauthorized user is attempting to access the computer system.

* * * * *